(12) United States Patent
Vilaipornsawai et al.

(10) Patent No.: US 9,780,986 B2
(45) Date of Patent: Oct. 3, 2017

(54) SYSTEM AND METHOD FOR LOW PEAK TO AVERAGE POWER RATIO MULTIPLE ACCESS COMMUNICATIONS

(71) Applicant: Huawei Technologies Co., Ltd., Shenzhen (CN)

(72) Inventors: Usa Vilaipornsawai, Nepean (CA); Jianglei Ma, Ottawa (CA); Hosein Nikopour, San Jose, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/408,002

(22) Filed: Jan. 17, 2017

(65) Prior Publication Data

US 2017/0126455 A1 May 4, 2017

Related U.S. Application Data

(62) Division of application No. 14/521,387, filed on Oct. 22, 2014, now Pat. No. 9,577,779.

(51) Int. Cl.
*H04L 27/26* (2006.01)
*H04J 13/10* (2011.01)
*H04W 4/00* (2009.01)

(52) U.S. Cl.
CPC .......... *H04L 27/2617* (2013.01); *H04J 13/10* (2013.01); *H04W 4/005* (2013.01)

(58) Field of Classification Search
CPC ...... H04L 27/2617; H04J 13/10; H04W 4/005
See application file for complete search history.

(56) References Cited

U.S. PATENT DOCUMENTS

2012/0027113 A1 2/2012 Gaal et al.
2013/0142277 A1 6/2013 Yeon et al.

FOREIGN PATENT DOCUMENTS

CN 101594177 A 12/2009
WO 2008021392 A2 2/2008

OTHER PUBLICATIONS

Al-Imari, M., et al., "Reducing the Peak to Average Power Ratio of LDS-OFDM Signals," International Symposium on Wireless Communication Systems, Sep. 19-22, 2010, pp. 922-926.
Newman, D. J., "An L1 Extremal Problem for Polynomials," http://www.ams.org/journals/proc/1965-016-06/S0002-9939-1965-0185119-4/S0002-9939-1965-0185119-4.pdf, recieved Oct. 22, 2014, 4 pages.
Schroeder, M., "Synthesis of low-peak-factor signals and sequences with low autocorrelation," IEEE Transactions Information Theory, vol. 16, Issue 1, Jan. 1970, pp. 85-89.
Van Den Bos, A., "A New Method for Synthiesis of Low-Peak-Factor Signals," IEEE Transactions on Acoustics, Speech, and Signal Processing, vol. ASSP-35, No. 1, Jan. 1, 1987, pp. 120-122.

*Primary Examiner* — Siming Liu
(74) *Attorney, Agent, or Firm* — Slater Matsil, LLP

(57) ABSTRACT

A method for generating a virtual codebook of low peak to average power ratio (PAPR) sequences includes generating a plurality of low PAPR combination block sequences, with each low PAPR combination block sequence including at least one of a plurality of sparse codebook, and applying time domain hopping to the plurality of low PAPR combination block sequences, thereby producing a virtual codebook. The method also includes storing the virtual codebook.

20 Claims, 11 Drawing Sheets

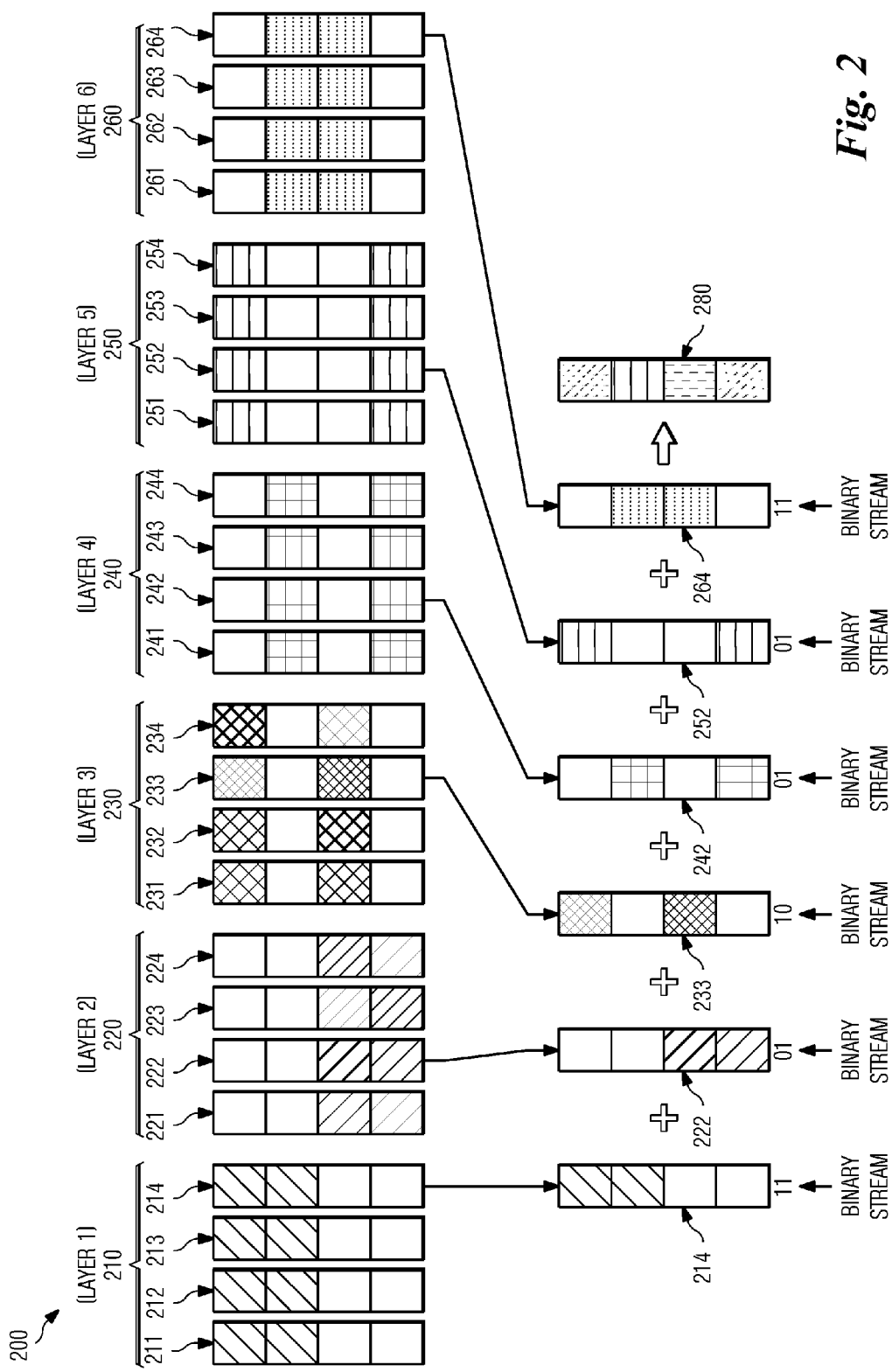

SYSTEM AND METHOD FOR LOW PEAK TO AVERAGE POWER RATIO MULTIPLE ACCESS COMMUNICATIONS

CROSS-REFERENCE TO RELATED APPLICATIONS

This application is a divisional of U.S. patent application Ser. No. 14/521,387, filed on Oct. 22, 2014, which application is hereby incorporated herein by reference.

TECHNICAL FIELD

The present disclosure relates generally to digital communications, and more particularly to a system and method for low peak to average power ratio (PAPR) multiple access.

BACKGROUND

Recently, low density signature (LDS) and sparse code multiple access (SCMA) have been introduced as new multicarrier waveforms used for multiple access. Communications systems that utilize LDS or SCMA waveforms can support system overloading (i.e., support more users than the available resources would otherwise support). Therefore, they are attractive waveform candidates in future technical standards such as envisioned Fifth Generation (5G) communications systems for applications requiring connectivity for very large numbers of devices, such as in some applications machine to machine (M2M) communications. In addition to supporting the ability to connect a large number of devices, some M2M deployments are also designed to make use of low cost devices. Therefore, there is a desire to provide connectivity for large numbers of low cost devices.

SUMMARY

Example embodiments of the present disclosure which provide a system and method for low peak to average power ratio (PAPR) multiple access.

In accordance with an example embodiment of the present disclosure, a method for generating a virtual codebook of low peak to average ratio (PAPR) sequences of sparse codebooks is provided. The method includes generating, by a designing device, a plurality of low PAPR combination block sequences, with each low PAPR combination block sequence including at least one of a plurality of sparse codebook, and applying, by the designing device, time domain hopping to the plurality of low PAPR combination block sequences, thereby producing a virtual codebook. The method also includes storing, by the designing device, the virtual codebook.

In accordance with another example embodiment of the present disclosure, a method for operating a transmitting device is provided. The method includes retrieving, by the transmitting device, a plurality of virtual codebooks, each virtual codebook derived from a plurality of low peak to average power ratio (PAPR) combination block sequences, with each low PAPR combination block sequence including at least one of a plurality of sparse codebooks, and determining, by the transmitting device, an assignment of one of the plurality of virtual codebooks for the transmitting device. The method also includes transmitting, by the transmitting device, a packet towards a receiving device in accordance with the assigned virtual codebook.

In accordance with another example embodiment of the present disclosure, a method for operating a receiving device is provided. The method includes retrieving, by the receiving device, a plurality of virtual codebooks, each virtual codebook derived from a plurality of low peak to average power ratio (PAPR) combination block sequences, with each low PAPR combination block sequence including at least one of a plurality of sparse codebooks, and receiving, by the receiving device, a transmission encoded in accordance with one of the plurality of virtual codebooks.

In accordance with another example embodiment of the present disclosure, a transmitting device is provided. The transmitting device includes a processor, and a transmitter operatively coupled to the processor. The processor retrieves a plurality of virtual codebooks, each virtual codebook derived from a plurality of low peak to average power ratio (PAPR) combination block sequences, with each low PAPR combination block sequence including at least one of a plurality of sparse codebooks, and determines an assignment of one of the plurality of virtual codebook to the transmitting device. The transmitter transmits a packet towards a receiving device in accordance with the assigned virtual codebook.

In accordance with another example embodiment of the present disclosure, a receiving device is provided. The receiving device includes a processor, and a receiver operatively coupled to the processor. The processor retrieves a plurality of virtual codebooks, each virtual codebook derived from a plurality of low peak to average power ratio (PAPR) combination block sequences, with each low PAPR combination block sequence including at least one of a plurality of sparse codebooks. The receiver receives a transmission encoded in accordance with one of the plurality of virtual codebooks.

One advantage of an embodiment is that large numbers of combination block sequence usage patterns with low PAPR are available to support massive numbers of devices in a multi-carrier communications system.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 2 illustrates an example SCMA multiplexing scheme for encoding data according to example embodiments described herein;

DETAILED DESCRIPTION OF ILLUSTRATIVE EMBODIMENTS

Figure 1:
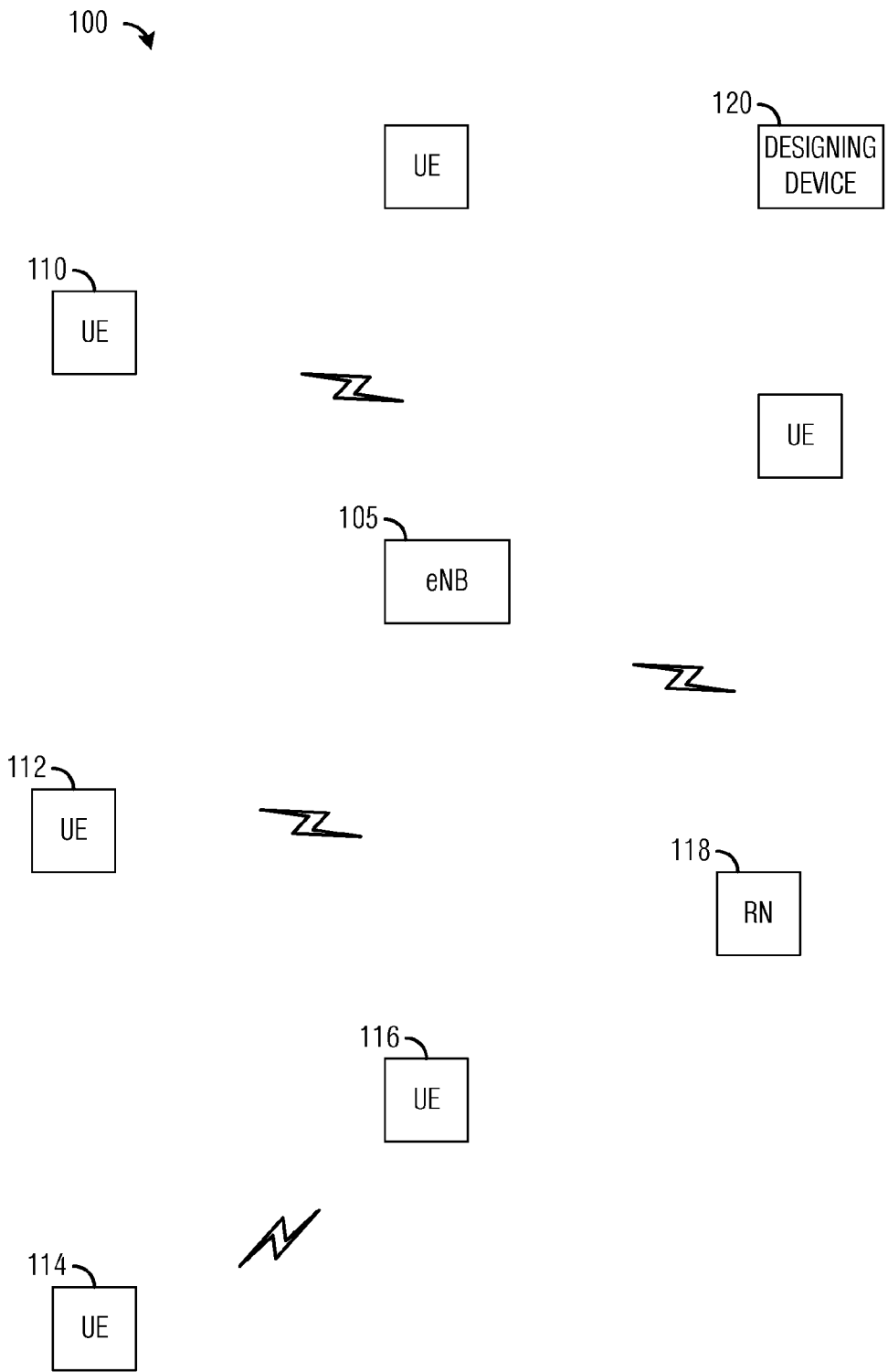
FIG. 1 illustrates an example communications system according to example embodiments described herein.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to low peak to average power ratio (PAPR) multiple access. For example, a designing device generates a plurality of low PAPR combination block sequences, with each low PAPR combination block sequence including at least one of a plurality of sparse codebook, and applies time domain hopping (which should be understood to include combination block sequence hopping in the time domain) to the plurality of low PAPR combination block sequences, thereby producing a virtual codebook. The designing device also stores the virtual codebook.

The present disclosure will be described with respect to example embodiments in a specific context, namely SCMA and/or LDS communications systems that support connectivity for a large number of devices. The disclosure may be applied to standards compliant communications systems, such as those that are compliant with Third Generation Partnership Project (3GPP), IEEE 802.11, and the like, technical standards, and non-standards compliant communications systems, that use SCMA and/or LDS to support connecting a large number of devices.

As is known in the art, Code division multiple-access (CDMA) is a multiple access technique in which data symbols are spread out over orthogonal and/or near orthogonal code sequences. Traditional CDMA encoding is a two step process in which a binary code is mapped to a quadrature amplitude modulation (QAM) symbol before a spreading sequence is applied. While traditional CDMA encoding can provide relatively high data rates, new techniques/mechanisms for achieving even higher data rates are needed to meet the ever-growing demands of next-generation wireless networks. Low density spreading (LDS) is a form of CDMA used for multiplexing different layers of data. LDS uses repetitions of the same symbol on layer-specific non-zero position in time or frequency. As an example, in LDS-orthogonal frequency division multiplexing (OFDM) a constellation point is repeated (with some possible phase rotations) over nonzero frequency tones of a LDS block.

Sparse code multiple access (SCMA) is a codebook-based non-orthogonal multiplexing technique realized by superimposing of multi-dimensional codewords selected form SCMA codebooks. Instead of spreading of QAM symbols as in LDS, coded bits are directly mapped to multi-dimensional sparse complex codewords. The major benefit of SCMA codebooks is the shaping gain of multi-dimensional constellations over repetition coding of LDS spreading. SCMA is classified as a waveform/modulation and multiple access scheme. SCMA codewords are laid over multi-carrier tones such as OFDM. In SCMA overloading is achievable with moderate complexity of detection thanks to the sparseness of SCMA codewords. SCMA can show noticeable gain over LDS especially for larger constellation sizes where the gain of constellation shaping is potentially larger. Even though LDS may show poor link performance for larger constellation orders, it provides system advantages due to its spreading and overloading capabilities. Interference whitening, open-loop user multiplexing and massive connectivity are some examples showing the benefit of LDS from system point of view. SCMA is a spreading and multiplexing technique that offers all the system benefits of LDS, while it maintains or even improves the link performance in comparison with OFDMA. Therefore, SCMA brings the link advantages of OFDMA and system advantages of LDS all altogether.

In SCMA, data is spread over multiple time-frequency tones of OFDMA resources through multi-dimensional codewords. Sparsity of codebooks used in SCMA helps to reduce the complexity of joint detection of multiplexed SCMA layers by using message passing algorithm (MPA). In general, each layer of SCMA has its specific codebook set. Low density spreading (LDS) is a special case of SCMA. LDS as a form of multi-carrier CDMA (MC-CDMA) is used for multiplexing different layers of data. As opposed to SCMA which uses multi-dimensional codebooks, LDS uses repetitions of the same quadrature amplitude modulation (QAM) symbol on layer-specific nonzero position in time or frequency. In applications of LDS, signatures are used to spread data. As an example, in LDS-orthogonal frequency division multiplexing (LDS-OFDM) a constellation point is repeated (with some possible phase rotations) over nonzero frequency tones of a LDS block. The shaping gain of multi-dimensional constellations is one of the advantages of SCMA over LDS. The gain is potentially high for higher order modulations where the repetition coding of LDS shows a large loss and poor performance.

SCMA is an encoding technique that encodes data streams, such as binary data streams, or in general, M-ary data streams, where M is an integer number greater than or equal to 2) into multidimensional codewords. SCMA directly encodes the data stream into multidimensional codewords and circumvents quadrature amplitude modulation (QAM) symbol mapping, which may lead to coding gain over conventional CDMA (and LDS) encoding. Notably, SCMA encoding techniques convey data streams using a multidimensional codeword rather than a QAM symbol.

Additionally, SCMA encoding provides multiple access through the use of different codebooks for different multiplexed layers, as opposed to the use of different spreading sequences for different multiplexed layers, e.g., a LDS signatures in LDS, as is common in conventional CDMA encoding. Furthermore, SCMA encoding typically uses codebooks with sparse codewords that enable receivers to use low complexity algorithms, such as message passing algorithms (MPA), to detect respective codewords from combined codewords received by the receiver, thereby reducing processing complexity in the receivers. Hence, the codebooks used in SCMA to spread the data may be referred to as sparse codebooks, and in LDS (a special case of SCMA), sparse signatures may be used to refer to the signatures used to spread the data.

As discussed previously, the ability to support overloading in communications systems utilizing SCMA and/or LDS makes the two multicarrier waveforms attractive for use in applications that require massive connectivity, such as M2M applications. However, the multicarrier nature of SCMA and LDS waveforms, as well as with other multicarrier waveforms, such as orthogonal frequency division multiplexing (OFDM), and the like, leads to communications with high PAPR. High PAPR communications generally require transmitters with expensive and inefficient power amplifiers, which is counter to the low cost devices targeted for M2M applications.

FIG. 1 illustrates an example communications system 100. Communications system 100 may include an evolved NodeB (eNB) 105 operating as a communications controller. Communications system 100 may also include user equipment (UE), such as UE 110, UE 112, UE 114, and UE 116. eNB 105 may include multiple transmit antennas and multiple receive antennas to facilitate MIMO operation, wherein a single eNB may simultaneously transmit multiple data streams to multiple users, a single user also with multiple receive antennas, or a combination thereof. Similarly, the UEs may include multiple transmit antennas and multiple receive antennas to support MIMO operation. In general, an eNB may also be referred to as a communications controller, a NodeB, a base station, a controller, and the like. Similarly, a UE may also be referred to as a mobile device, a mobile station, a mobile, a terminal, a user, a subscriber, and the like. Communications system 100 may also include a relay node (RN) 118 that is capable of utilizing a portion of resources of eNB 105 to help improve coverage and/or overall performance of communications system 100.

While it is understood that communications systems may employ multiple eNBs capable of communicating with a number of UEs, only one eNB, one RN, and a number of UEs are illustrated for simplicity.

A designing device 120 may design sparse signatures and/or sparse codebooks for eNBs and/or UEs in communications system 100. Designing device 120 may also design virtual codebooks which may contain one or more combination block sequences. The combination block sequences may comprise one or more sparse codebooks (or sparse signatures in LDS) with low PAPR to facilitate massive connectivity in SCMA and/or LDS communications systems. Detailed descriptions of example embodiments for designing virtual codebooks of combination block sequences with low PAPR to facilitate massive connectivity are presented herein. Although shown in FIG. 1 as a stand-alone device, designing device 120 may be co-located with another entity in communications system 100, such as an eNB, or some other entity. Additionally, there may be multiple designing devices, with each designing device designing sparse codebooks, sparse signatures, virtual codebooks, and the like, for different portions of communications system 100.

FIG. 2 illustrates an example SCMA multiplexing scheme 200 for encoding data. As shown in FIG. 2, SCMA multiplexing scheme 200 may utilize a plurality of sparse codebooks, such as sparse codebook 210, sparse codebook 220, sparse codebook 230, sparse codebook 240, sparse codebook 250, and sparse codebook 260. Each sparse codebook of the plurality of sparse codebooks is assigned to a different multiplexed layer. Each sparse codebook includes a plurality of multidimensional codewords (or spreading sequences). It is noted that in SCMA, the multidimensional codewords are low density sequence signatures or similarly, sparse codewords. More specifically, sparse codebook 210 includes codewords 211-214, sparse codebook 220 includes codewords 221-224, sparse codebook 230 includes codewords 231-234, sparse codebook 240 includes codewords 241-244, sparse codebook 250 includes codewords 251-254, and sparse codebook 260 includes codewords 261-264.

Each codeword of a respective sparse codebook may be mapped to a different data, e.g., binary, value. As an illustrative example, codewords 211, 221, 231, 241, 251, and 261 are mapped to binary value '00', the codewords 212, 222, 232, 242, 252, and 262 are mapped to the binary value '01', the codewords 213, 223, 233, 243, 253, and 263 are mapped to the binary value '10', and the codewords 214, 224, 234, 244, 254, and 264 are mapped to the binary value '11'. It is noted that although the sparse codebooks in FIG. 2 are depicted as having four codewords each, SCMA sparse codebooks in general may have any number of codewords. As an example, SCMA sparse codebooks may have 8 codewords (e.g., mapped to binary values '000' . . . '111'), 16 codewords (e.g., mapped to binary values '0000' . . . '1111'), or more.

As shown in FIG. 2, different codewords are selected from various sparse codebooks 210, 220, 230, 240, 250, and 260 depending on the binary data being transmitted over the multiplexed layer. In this example, codeword 214 is selected from sparse codebook 210 because the binary value '11' is being transmitted over the first multiplexed layer, codeword 222 is selected from sparse codebook 220 because the binary value '01' is being transmitted over the second multiplexed layer, codeword 233 is selected from sparse codebook 230 because the binary value '10' is being transmitted over the third multiplexed layer, codeword 242 is selected from sparse codebook 240 because the binary value '01' is being transmitted over the fourth multiplexed layer, codeword 252 is selected from sparse codebook 250 because the binary value '01' is being transmitted over the fifth multiplexed layer, and codeword 264 is selected from sparse codebook 260 because the binary value '11' is being transmitted over the sixth multiplexed layer. Codewords 214, 222, 233, 242, 252, and 264 may then be multiplexed together to form multiplexed data stream 280, which is transmitted over shared resources of a network. Notably, codewords 214, 222, 233, 242, 252, and 264 are sparse codewords, and therefore can be identified upon reception of multiplexed data stream 280 using a low complexity algorithm, such as a message passing algorithm (MPA) or a turbo decoder.

As an example, consider an uplink pblock LDS/SCMA signal, where each block uses a signature/codeword of length K. Hence, this signal spans JK subcarriers. Let $b_n$, n=0,1, ..., JK−1 denote the SCMA and/or LDS spread data associated with the $n^{th}$ subcarrier, where $b_n$ can assume value 0 due to the sparseness of the SCMA and/or LDS sparse codebook and/or signature. The time domain SCMA and/or LDS signal is expressible as $$x(t) = \frac{1}{\sqrt{JK}} \sum_{n=0}^{JK-1} b_n e^{j2\pi \frac{n}{T}t}.$$

For discussion purposes, consider an LDS example where $d=[d_0\ d_1\ \ldots\ d_{J-1}]^T$ denotes a data symbol vector of length J and each symbol is spread using a signature $s=[s_0\ s_1\ \ldots\ s_{K-1}]^T$ (with $|s|^2=1$). In this case, $b=d\otimes s$ is the data vector after LDS spreading, where $\otimes$ denotes Kronecker product operator and $b_n=d_j s_k$, n=jK+k, j=0, ..., J−1, k=0, ..., K−1.

In the literature, the PAPR of x(t) is expressible as $$PAPR = \frac{\max_{0 \leq t \leq T} |x(t)|^2}{\frac{1}{T}\int_0^T |x(t)|^2 dt},$$

where $$|x(t)|^2 = \frac{1}{JK}\sum_{n=0}^{JK-1}|b_n|^2 + \frac{2}{JK}Re\left(\sum_{n=1}^{JK-1}\rho_n e^{j2\pi\frac{n}{T}t}\right)$$

is the instantaneous power of x(t), with $$\frac{1}{JK}\sum_{n=0}^{JK-1}|b_n|^2$$

being the average power, and $\rho_n \leq \sum_{k=0}^{JK-n-1} b_k b_{k+n}^*$, n=0, 1, ..., JK−1 being the aperiodic autocorrelation of $b_n$. Then, it may be possible to express PAPR as $$PAPR = \max_{0 \leq t \leq T}\left(1 + \frac{2Re\left(\sum_{n=1}^{JK-1}\rho_n e^{j2\pi\frac{n}{T}t}\right)}{\sum_{n=0}^{JK-1}|b_n|^2}\right).$$

In order to obtain some insight on the PAPR of SCMA and/or LDS signals, a simple PAPR analysis of a 1-block signal using a signature with 2 non-zero elements is discussed herein. That is, consider J=1, K=4, N=2, i.e., $d=d_0$, $s=[0\ |s_1|e^{j\varphi_1}\ 0\ |s_3|e^{j\varphi_3}]^T$, so that $b=d_0\cdot[0\ |s_1|e^{j\varphi_1}\ 0\ |s_3|e^{j\varphi_3}]^T$, where $$[\rho_0\ \rho_1\ \rho_2\ \rho_3] = |d_0|^2 \cdot [1\ 0\ |s_1|\cdot|s_3|e^{j(\varphi_1-\varphi_3)}\ 0],$$

and $$Re\left(\sum_{n=1}^{JK-1}\rho_n e^{j2\pi\frac{n}{T}t}\right) = |s_1|\cdot|s_3|\cos\left(2\pi\frac{2}{T}t + (\varphi_1-\varphi_3)\right).$$

Hence, the PAPR of this signal is expressed as $1+2\cdot|s_1|\cdot|s_3|$. It can be shown that the PAPR is maximum at 3 dB when $|s_1|=|s_3|=1/\sqrt{2}$, and minimum at 0 dB when either $|s_1|$ or $|s_3|$ equals 0 (i.e., the system is reduced to a single carrier system). This is true regardless of spreading pattern (e.g., signature and/or codeword) length K, as well as the phases and positions of non-zero elements. For SCMA, since there is power imbalance in non-zero subcarriers of a codeword (e.g., $|s_1|\neq|s_3|$), the PAPR of 1-block SCMA signal is lower than that of LDS signal (i.e., $|s_1|=|s_3|$). However, for multiple-block SCMA and/or LDS, the interaction between phases of multiple data symbols and those of the signatures/codewords make the PAPR of SCMA and/or LDS signals data-dependent. Therefore, the complementary cumulative distribution function (CCDF) of the PAPR is considered. The CCDF of the PAPR is the probability that the PAPR is higher than a given PAPR threshold, $PAPR_{Th}$, i.e., CCDF (PAPR)=Pr(PAPR>$PAPR_{Th}$)), over all possible data combinations (i.e., applicable for small block size). For a larger block sizes, the CCDF of PAPR may be obtained using simulation, such as Monte Carlo simulation. Moreover, $PAPR_{99.9\%}$ denotes the 99.9-percentile PAPR and may be defined as Pr(PAPR>$PAPR_{99.9\%}$)=$10^{-3}$.

According to an example embodiment, narrow-band SCMA and/or LDS is used to transmit a data packet. Typically, for a data packet of given size, transmission on a narrow-band channel will take longer than transmission on a wide-band channel. However, in some applications, such as where massive connectivity and very low PAPR are requirements, long delays can be tolerated.

Figure 3A:
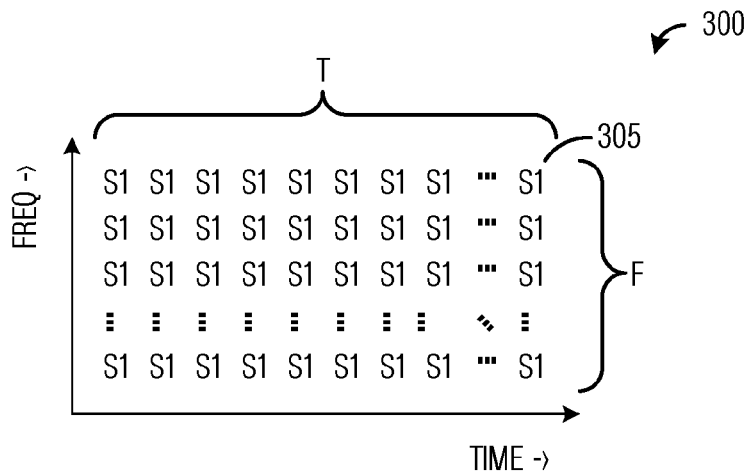
FIG. 3a illustrates an example arrangement of network resources used in a transmission of a data packet using wide-band SCMA and/or LDS according to example embodiments described herein.

FIG. 3a illustrates an example arrangement 300 of network resources used in a transmission of a data packet using wide-band SCMA and/or LDS. In general, network resources may include time resources (such as time slots as specified for a frequency band), frequency resources (such as frequency bands as specified for a time slot), or a combination of both time resources and frequency resources (such as multiple frequency bands and multiple time slots). As its name implies, wide-band SCMA and/or LDS makes use of a relatively large number of frequency resources to transmit a data packet. Since many frequency resources, shown in FIG. 3a as F, are available to transmit the data packet, a relatively small amount of time resources, shown in FIG. 3a as T, are needed. Typically, as F is increased, T decreases as long as the amount of data transmitted remains constant. A portion of the data packet carried in a time-frequency resource, such as time-frequency resource 305, may be spread using a signature. As shown in FIG. 3a, a single signature S1 is used for spreading the portions of the data packet in all of the time-frequency resources.

Figure 3B:
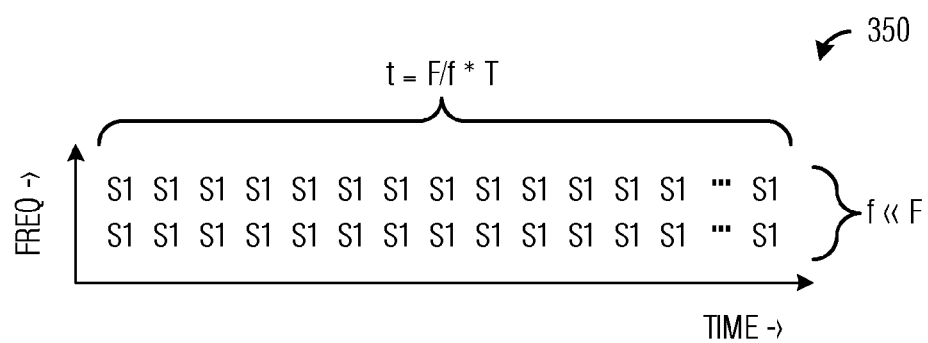
FIG. 3b illustrates an example arrangement of network resources used in a transmission of a data packet using narrow-band SCMA and/or LDS according to example embodiments described herein.

FIG. 3b illustrates an example arrangement 350 of network resources used in a transmission of a data packet using narrow-band SCMA and/or LDS. As shown in FIG. 3b, a relatively small number of frequency resources, shown in FIG. 3b as f, with f<<F, are available to transmit the data packet. Since f is small, the number of time resources, shown in FIG. 3b as t, needed to transmit the data packet is large (assuming that the data packets transmitted in FIG. 3*a* and FIG. 3*b* are equal in size). In general, the number of time resources may be expressible as $$t=F/f*T.$$

As an illustrative example, if F/f is equal to 4, then t is 4*T. Again, a single signature S1 is used for spreading the portions of the data packet in all of the time-frequency resources.

As discussed previously, in order to support some applications (such as M2M applications), the ability to connect a large number of devices and very low PAPR may enable a variety of different deployment scenarios. However, SCMA and/or LDS transmissions are generally high PAPR transmissions due to their multicarrier nature. Therefore, there is a need for massive connectivity and very low PAPR in SCMA and/or LDS communications systems in order to support such applications.

According to an example embodiment, a system and method for low PAPR communications is provided. The system and method designs virtual codebooks of combination block sequences (sparse codebook or sparse signature sequences used to spread data being transmitted) with low PAPR that are usable in SCMA and/or LDS communications system. The system and method supports communications between a transmitting device and a receiving device using the virtual codebooks of combination block sequences.

Figure 4:
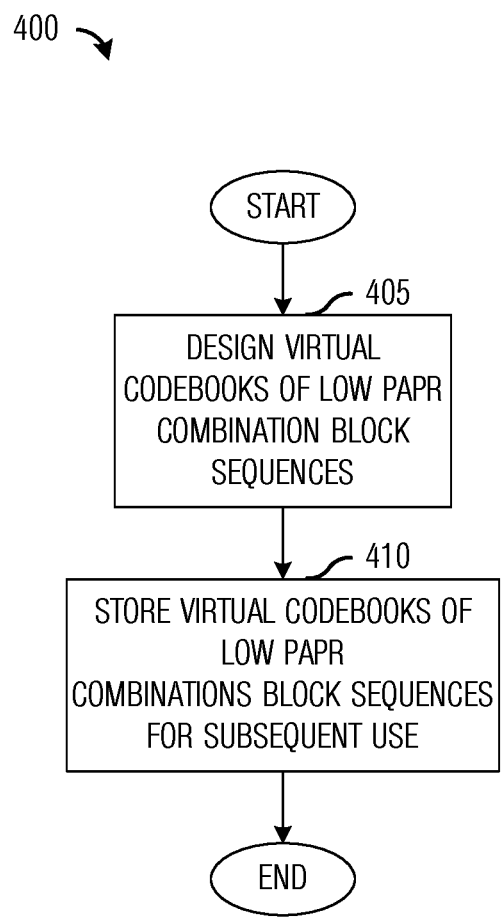
FIG. 4 illustrates a flow diagram of example operations occurring in the designing and storing of virtual codebooks of combination block sequences with low PAPR that are usable in SCMA and/or LDS communications systems according to example embodiments described herein.

FIG. 4 illustrates a flow diagram of example operations 400 occurring in the designing and storing of virtual codebooks of combination block sequences with low PAPR that are usable in SCMA and/or LDS communications systems. Operations 400 may be indicative of operations occurring in the designing and storing of combination block sequences, such as by a designing device, for example, a stand-alone designing device (e.g., designing device 120) or a co-located designing device (e.g., a co-located designing device located in an eNB or a network entity), as the designing device designs and stores virtual codebooks of combination block sequences with low PAPR that are usable in SCMA and/or LDS communications systems.

Operations 400 may begin with the designing of virtual codebooks of low PAPR combination block sequences (block 405). The designing of the virtual codebooks of low PAPR combination block sequences may begin with the application of signature and/or codebook hopping to sparse codebooks or sparse signatures to produce available combination block sequences (i.e., to increase a number of combination block sequences) and then applying one or more phase rotation techniques to the available combination block sequences to optimize a PAPR for each of the available combination block sequences. Since not all of the available combination block sequences have low (or sufficiently low) PAPR (even after PAPR optimization), a specified number of available combination block sequences with PAPR that meet a specified PAPR threshold may be selected, thereby producing low PAPR combination block sequences. The virtual codebooks may be formed from the low PAPR combination block sequences by using combination block sequence hopping in the time domain (referred to herein as time domain hopping). Detailed discussion of example techniques for designing virtual codebooks of combination block sequences with low PAPR are presented below. The virtual codebooks of low PAPR combination block sequences may be stored for subsequent use (block 410). The virtual codebooks of low PAPR combination block sequences may be stored in a memory local to the designing device. The virtual codebooks of low PAPR combination block sequences may be stored in memories of transmitting devices and/or receiving devices. The virtual codebooks of low PAPR combination block sequences may be stored in a remote database. The virtual codebooks of low PAPR combination block sequences may be provided to communications devices, such as eNBs, UEs, and the like.

Figure 5:
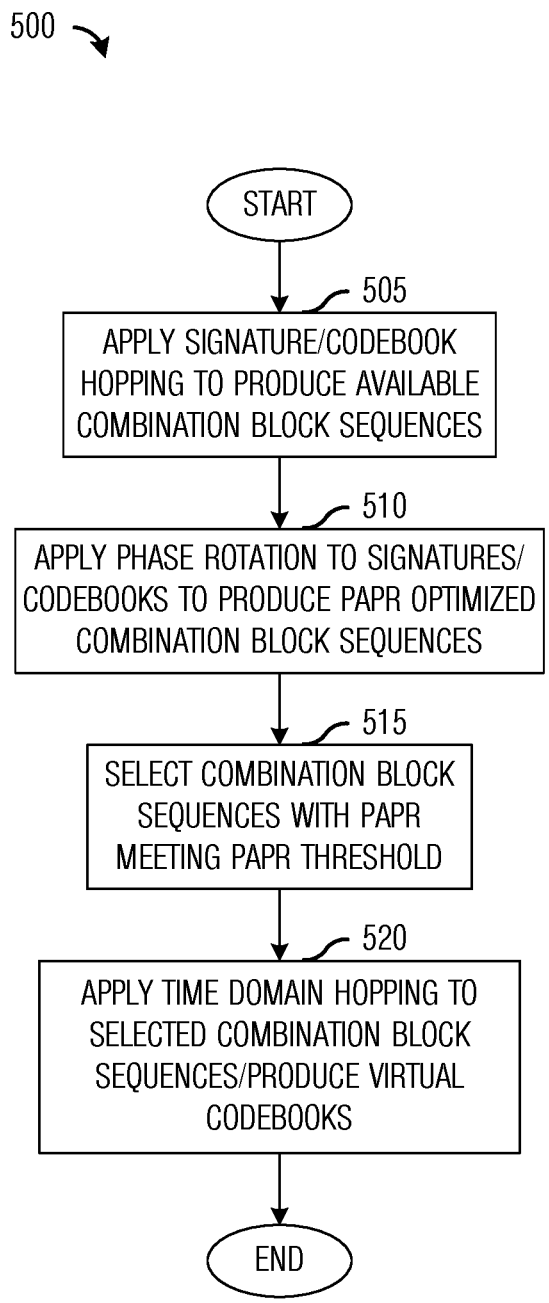
FIG. 5 illustrates a flow diagram of example operations occurring in the designing of virtual codebooks of low PAPR combination block sequences according to example embodiments described herein.

FIG. 5 illustrates a flow diagram of example operations 500 occurring in the designing of virtual codebooks of low PAPR combination block sequences. Operations 500 may be indicative of operations occurring in the designing of virtual codebooks of low PAPR combination block sequences, for example, in a designing device, such as a stand-alone designing device (e.g., designing device 120) or a co-located designing device (e.g., a co-located designing device located in an eNB or a network entity), as the designing device designs virtual codebooks of low PAPR combination block sequences. Operations 500 may be an example embodiment of designing virtual codebooks of low PAPR combination block sequences, block 405 of FIG. 4.

Operations 500 may begin with the designing device applying signature and/or codebook hopping to sparse codebooks to produce available combination block sequences (block 505). As an illustrative example, the designing device may retrieve the sparse codebooks from a local or remote memory and apply signature and/or codebook hopping in the frequency domain to the sparse codebooks to produce the combination block sequences. As an illustrative example, consider a situation where the combination block sequences of length two blocks generated from 6 sparse codebooks denoted S1, S2, S3, S4, S5, and S6. The application of the signature and/or codebook hopping to the sparse codebooks may yield a total of $6^2=36$ combination block sequences (each two blocks long) of sparse codebooks, with a first example combination block sequence comprising S1:S1 (shown in FIG. 6*a* as combination block sequence 605), a second example combination block sequence comprising S1:S2 (shown in FIG. 6*a* as combination block sequence 607), a third example combination block sequence being S1:S3 (shown in FIG. 6*a* as combination block sequence 609), and so on, to a 36-th example combination block sequence being S6:S6 (shown in FIG. 6*a* as combination block sequence 611).

Figure 6A:
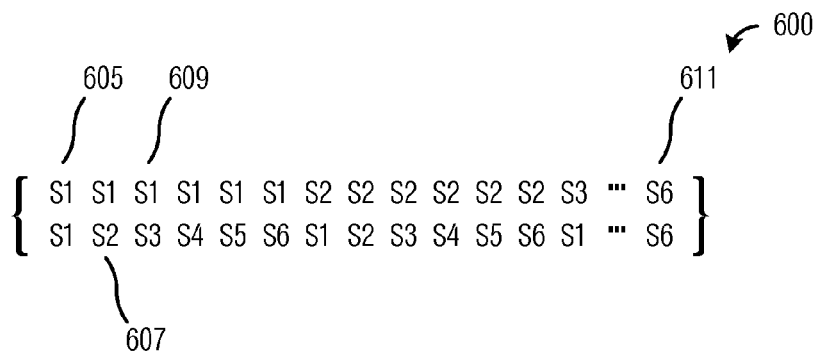
FIG. 6a illustrates example combination block sequences according to example embodiments described herein.

FIG. 6*a* illustrates example combination block sequences 600. Combination block sequences 600 include combination block sequences that are two blocks long that are generated from 6 sparse codebooks (and/or signatures). It is noted that S1, S2, S3, S4, S5, and S6 are shorthand notation for the distinct sparse codebooks, and that actual sparse codebooks may be sequences of values, such as 1, 0, −1, and the like.

Referring back now to FIG. 5, the designing device may apply a phase rotation to the available combination block sequences of sparse codebooks to produce PAPR optimized combination block sequences (block 510). According to an example embodiment, one or more of a variety of phase rotations may be applied to each of the available combination block sequences. Examples of the phase rotations include a Newman Phase rotation, a Shroeder Phase rotation, a Modified Shroeder Phase rotation, and the like. The Newman Phase rotation may be expressed mathematically as $$\phi_n = \frac{\pi(n-1)^2}{JK},$$

n=0, . . . , JK−1 where K is the index of the subcarriers after SCMA and/or LDS spreading.

The Shroeder Phase rotation may be expressed mathematically as:

$$\phi_l' = \phi_{l-1}' + 2\pi(n_l - n_{l-1})\Sigma_{m=1}^{l-1} p_{n_m}, l=1, \ldots, JN,$$

where it is assumed that $\phi_0'=0$ without loss of generality. For flat spectrum, $p_{n_l}=1/JN$, $l=1, \ldots, JN$, where $n_l$ denotes the index of $l^{th}$ non-zero subcarrier and $p_{n_l}$ be the normalized power associated with the subcarrier.

The modified Shroeder Phase rotation may be expressed mathematically as:

$$\phi_l''=\phi_{l-1}''+2\pi\Sigma_{m=1}^{l-1}p_{n_m}, \ l=1, \ldots, JN,$$

where for flat spectrum, $$p_{n_L} = \frac{1}{L}, \ \phi_l'' = \frac{\pi(l-1)^2}{L}.$$

Although the application of the phase rotations to the available combination block sequences may yield an optimized PAPR for each of the available combination block sequences of sparse signatures, not all of the PAPR optimized combination block sequences have low PAPR, especially, not all of the PAPR optimized combination block sequences may have a PAPR low enough to meet M2M application requirements. The designing device may evaluate the PAPR optimized combination block sequences and select the PAPR optimized combination block sequences that meet a PAPR threshold (block 515). The selected combination block sequences may be referred to as low PAPR combination block sequences. As an illustrative example, the designing device may determine a PAPR for each of the PAPR optimized combination block sequences and compare the PAPRs for the PAPR optimized combination block sequences against the PAPR threshold. The designing device may select the PAPR optimized combination block sequences with PAPRs meeting the PAPR threshold (e.g., lower than the PAPR threshold). The PAPR threshold may be a predefined value that is specified by a technical standard, an operator of a communications system that includes the designing device, and the like. As an illustrative example, a fixed PAPR threshold may be 3 dB. The PAPR threshold may be adaptable, allowing for increases or decreases to meet performance metrics of the communications system. As an illustrative example, the PAPR threshold may be set according to device, e.g., receiving device and/or transmitting device, capability, such as radio frequency (RF) chain capability, battery capacity, and the like. If the device capability is poor, the PAPR threshold may be decreased, while if the device capability is high, the PAPR threshold may be increased to allow for more combination block sequences and support for more devices.

The selection of PAPR optimized combination block sequences with PAPR that meet the PAPR threshold can substantially reduce the number of combination block sequences available for use in SCMA and/or LDS communications. As an illustrative example, referring back to the example discussed above wherein available combination block sequences that are two blocks in length are generated from 6 sparse signatures and/or sparse codebooks, if the PAPR threshold is 3 dB, perhaps only 6 out of the 36 combination block sequences generated by the application of the phase rotation meet or exceed the PAPR threshold and may be referred to as low PAPR combination block sequences. Collectively, the application of the signature and/or codebook hopping (block 505), the application of the phase rotation (block 510), and the selection of the PAPR optimized combination block sequences may be referred to as generating low PAPR combination block sequences.

The designing device may apply time domain hopping to the low PAPR combination block sequences to increase the number of low PAPR combination block sequences available for communications, producing virtual codebooks of combination block sequences (block 520). Time domain hopping may involve the use of potentially different low PAPR combination block sequences in different time resources to help increase the number of different virtual codebooks, and therefore, reduce the probability of codeword and/or signature collisions within each SCMA or LDS block. The application of time domain hopping to the low PAPR combination block sequences produces virtual codebooks of combination block sequences, each of which specifies a sequence of low PAPR combination block sequences over time.

Figure 6B:
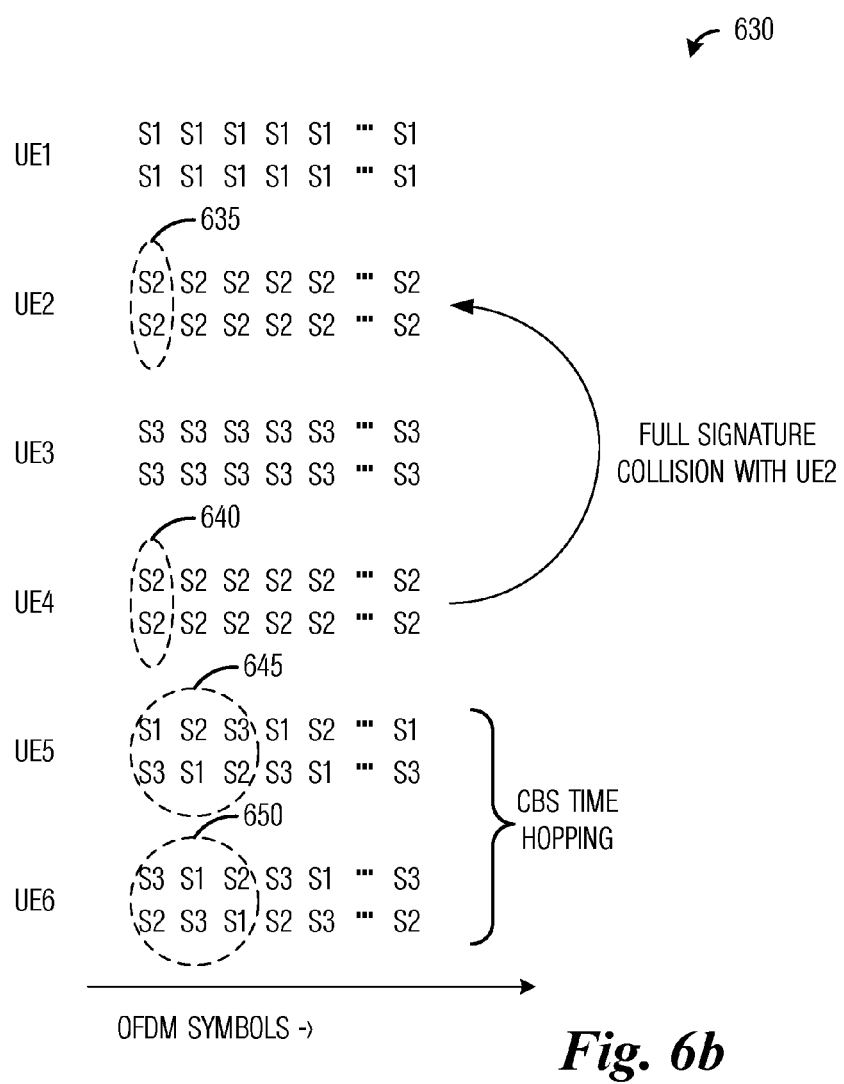
FIG. 6b illustrates example virtual codebooks assigned to different UEs, wherein the virtual codebooks are formed from combination block sequences that are two blocks in length using time domain hopping according to example embodiments described herein.

FIG. 6b illustrates example virtual codebooks 630 assigned to different UEs, wherein the virtual codebooks are formed from combination block sequences that are two blocks in length using time domain hopping. It is noted that each of the virtual codebooks shown in FIG. 6b are used over 2 blocks (SCMA or LDS), with the same 2 blocks for all UEs. Furthermore, the combination block sequences shown in FIG. 6b are low PAPR combination block sequences, such as after phase optimization. As shown in FIG. 6b, virtual codebook 635 (assigned to UE2) comprises combination block sequence S2:S2, with virtual codebook 635 being repeated as needed. Similarly, virtual codebook 640 (assigned to UE4) also comprises combination block sequence S2:S2, with virtual codebook 640 being repeated as needed. This results in collisions in every block used in transmissions by UE2 and UE4.

Also shown in FIG. 6b, virtual codebook 645 (assigned to UE5) comprises low PAPR combination block sequences: S1:S3; S2:S1; and S3:S2; and virtual codebook 645 is repeated. As an example, the first few repetitions of virtual codebook 645 may be:

S1:S3; S2:S1; S3:S2; S1:S3; S2:S1; S3:S2; S1:S3; S2:S1; S3:S2; . . . .

Similarly, virtual codebook 650 (assigned to UE6) comprises low PAPR combination block sequences: S3:S2; S1:S3; and S2:S1; and virtual codebook 650 is repeated. This results in no collisions between transmissions of UE5 and UE6, and relatively few collisions with UE1 through UE4.

Referring back to FIG. 5, typically, the application of time domain hopping may be described as follows:

Select a sequence of one or more low PAPR combination block sequences of sparse signatures as a virtual codebook. Hence, the virtual codebook may be one or more low PAPR combination block sequences in length. The sequence of one or more low PAPR combination block sequences may be selected in accordance with time domain hopping, random selection, pseudo-random selection, and the like. It is noted that the virtual codebook may include one or more repetitions of the sequence of one or more low PAPR combination block sequences.

As an illustrative example of the use of time domain hopping to select the sequence of one or more low PAPR combination block sequences, refer back to the example with 36 combination block sequences shown in FIG. 6a and assume that after PAPR optimization and selection using a PAPR threshold, the resulting low PAPR combination block sequences comprise sequences: S1:S1; S2:S2; S3:S3; S1:S3; S2:S1; and S3:S2. Time domain hopping selects low PAPR combination block sequences to populate elements of virtual codebooks. Therefore, for each element of a virtual codebook, one of the low PAPR combination block sequences is selected. To understand time domain hopping, consider an example virtual codebook with 3 elements (the virtual codebook may also be said to be a length 3 virtual codebook): time domain hopping may result in selecting one of the low PAPR combination block sequences for a first element of the virtual codebook, another one of the low PAPR combination block sequences for a second element of the virtual codebook, and yet another one of the low PAPR combination block sequences for a third element of the virtual codebook. The same or different low PAPR combination block sequences may be selected for the different elements of the virtual codebook. Example virtual codebooks may include:

Virtual Codebook 1: (S1:S1); (S1:S1); (S1:S1),
Virtual Codebook 2: (S2:S2); (S2:S2); (S2:S2),
Virtual Codebook 3: (S3:S3); (S3:S3); (S3:S3),
Virtual Codebook 4: (S1:S3); (S2:S1); (S3:S2),
Virtual Codebook 5: (S3:S2); (S1:S3); (S2:S1),
Virtual Codebook 6: (S2:S1); (S3:S2); (S1:S3), and the like.

In the use of a virtual codebook, the virtual codebook may be scaled with a scaling until a resulting sequence of the virtual codebook meets a length threshold. The length threshold may be a non-negative integer value that is at least as long as a longest expected packet transmission in terms of time resources. As an example, if the packet being transmitted occupies 30 time domain resource allocations (also referred to as a time resource), the sequence of low PAPR combination block sequences used to transmit the packet in accordance with the virtual codebook may need to be 30 combination block sequences long (one combination block sequence for each time based resource allocation). Hence, if the virtual codebook is 3 combination block sequences long (e.g., S3:S2; S1:S3; and S2:S1), then the virtual codebook is scaled by a scaling factor equal to 10 to produce a sequence of combination block sequences that is of sufficient length, while if the virtual codebook is 6 combination block sequences long, then the virtual codebook is scaled by a scaling factor equal to 5 times to produce a sequence of combination block sequences that is of sufficient length. When the scaling factor is an integer value greater than 1, the virtual codebook may be repeated (scaling factor) times, while when the scaling factor is a non-integer value greater than 1 (e.g., 1½, 5¾, 3⅓, and the like), the virtual codebook may be repeated (INT(scaling factor)) times and truncated by (FRACTION(scaling factor)), where function INT( ) returns an integer portion of a non-integer value and FRACTION( ) returns a fractional portion of the non-integer value.

Similarly, if the virtual codebook is longer than the number of time domain resources need to transmit the packet, the virtual codebook may be truncated by the scaling factor, which may be a real number smaller than 1. As an illustrative example, if the virtual codebook is 10 combination block sequences long and a packet transmission requires 6 time resources, the scaling factor is equal to 6/10 and the first 6 combination block sequences of virtual codebook may be used. It is noted that any sequence of 6 combination block sequences of the virtual codebook may be used while preserving low PAPR properties.

According to an example embodiment, the application of time domain hopping to the low PAPR combination block sequences may produce a large number virtual codebooks.

Each of the virtual codebooks may be specified by its sequence of low PAPR combination block sequences (e.g., S1S3; S2:S1; and S3:S2). As an example, the virtual codebook used by UE1 of FIG. 6b may include low PAPR combination block sequence S1:S1, while UE5 may include low PAPR combination block sequence S1S3; S2:S1; and S3:S2 for its virtual codebook, and UE6 may include low PAPR combination block sequence S3:S2; S1:S3; and S2:S1 for its virtual codebook. Each of the virtual codebooks used by the UEs shown in FIG. 6b may be scaled to meet the requirements of the illustrated packet transmissions. However, it may not be necessary to scale a virtual codebook if the virtual codebook is of sufficient length.

According to an example embodiment, a virtual codebook is specified by its sequence of low PAPR combination block sequences. Additionally, if the length of the virtual codebook is insufficient for a transmission, it is extended by a scaling factor to meet the requirements of the transmission. As an illustrative example, a virtual codebook of length 5 is automatically scaled by a scaling factor equal to 6 for the transmission of a packet that requires 30 time resources, while a scaling factor equal to 2 for the transmission of a packet that requires 10 time resources. For non-integer scaling factors, the virtual codebook may be truncated by the fractional portion of the non-integer scaling factor. As an illustrative example, for a packet that requires 22 time resources, a virtual codebook of length 5 may be scaled by a scaling factor of 4.4, meaning that the virtual codebook is repeated 4 times plus 4/10-th of the combination block sequences of the virtual codebook. Similarly, if the transmission of a packet requires fewer time resources than the length of the virtual codebook, the virtual codebook may be scaled by a scaling factor smaller than 1 utilizing truncation, for example. As an illustrative example, if a transmission of a packet requires 7 time resources, a virtual codebook of length 10 may be scaled by a scaling factor equal to 0.7.

According to an example embodiment, the virtual codebooks may be specified by a technical standard, an operator of the communications system, an agreement between communications devices, and the like. The virtual codebooks may have fixed length, and may be periodic in nature. Different virtual codebooks may have different lengths. Different virtual codebooks may have different periodicities. In practice, in order to minimize storage requirements, the virtual codebooks may be stored in their shortest non-repeated form and then extended to meet length requirements. As an illustrative example, if a first virtual codebook is defined from a single low PAPR combination block sequence (therefore, the first virtual codebook has a periodicity of 1), but is to be used in a situation where 5 time resources are need, then the virtual codebook may be repeated a total of 5 times to meet the length requirement. However, when stored, only the single low PAPR combination block sequence needs to be saved. Similarly, if a second virtual codebook is defined from two low PAPR combination block sequences (therefore, the second virtual codebook has a periodicity of 2), but is to be used in a situation where 5 time resources are needed, then the virtual codebook may be repeated a total of 2.5 times to meet the length requirement. However, when stored, only the two low PAPR combination block sequences are saved.

The communicating devices may share information about the virtual codebook to help simplify virtual codebook detection at a receiving device. According to an alternative example embodiment, the virtual codebooks may be random (or pseudo-random) in nature. If the virtual codebooks are random or pseudo-random, blind detection may be used at a receiving device to detect transmissions. Blind detection may involve the receiving device attempting to decode transmissions in time-frequency resources using each low PAPR combination block sequence as a decoding hypothesis. In general, the only time that the decoding of the transmission is successful is when the receiving device uses the same low PAPR combination block sequence in its decoding as was used to spread the data at the transmitting device. According to another alternative example embodiment, some communications devices may utilize virtual codebooks of specified sequences, while others may utilize virtual codebooks of randomly generated sequences.

Figure 6C:
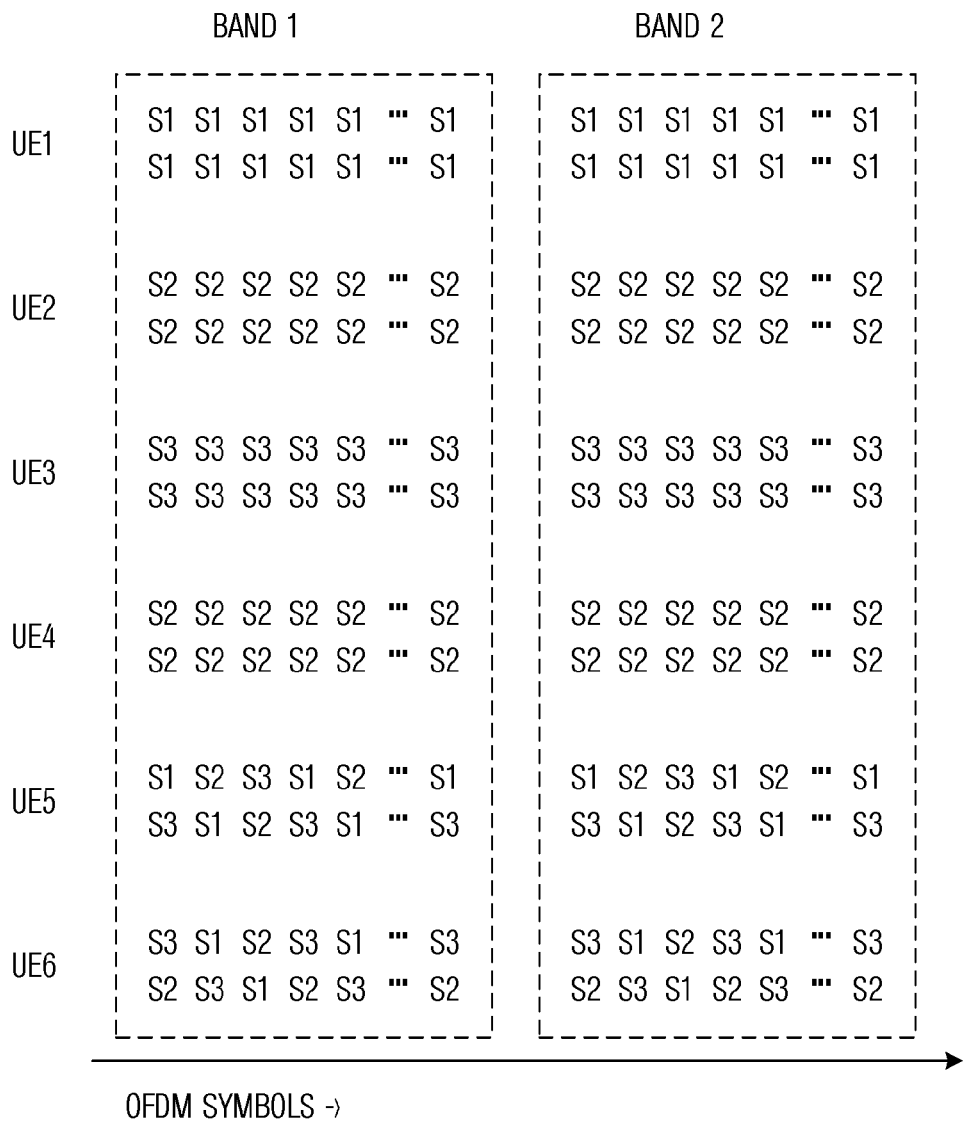
FIG. 6c illustrates example virtual codebooks assigned to different UEs with frequency band hopping, wherein the virtual codebooks are formed from combination block sequences according to example embodiments described herein.

According to an example embodiment, frequency band hopping may be applied to increase frequency diversity. In frequency band hopping, transmissions may be assigned to network resources in different frequency bands that may be spaced relatively far apart in frequency to allow a receiving device to exploit frequency diversity to help improve overall communications performance. In the different frequency bands, the transmissions may be made using the low PAPR combination block sequences and/or the virtual codebooks. FIG. 6c illustrates example virtual codebooks 660 assigned to different UEs with frequency band hopping, wherein the virtual codebooks are formed from low PAPR combination block sequences. The assignment of virtual codebooks in a first frequency band may simply be a duplicate of the assignment of virtual codebooks in a second frequency band, such as shown in FIG. 6c. Alternatively, the assignment of virtual codebooks in a first frequency band may be different from the assignment of virtual codebooks in a second frequency band. Alternatively, some UEs may be assigned the same virtual codebooks in different frequency bands, while other UEs may be assigned different virtual codebooks in different frequency bands. Alternatively, portions of a virtual codebook may be assigned to resources in different frequency bands.

Figure 7A:
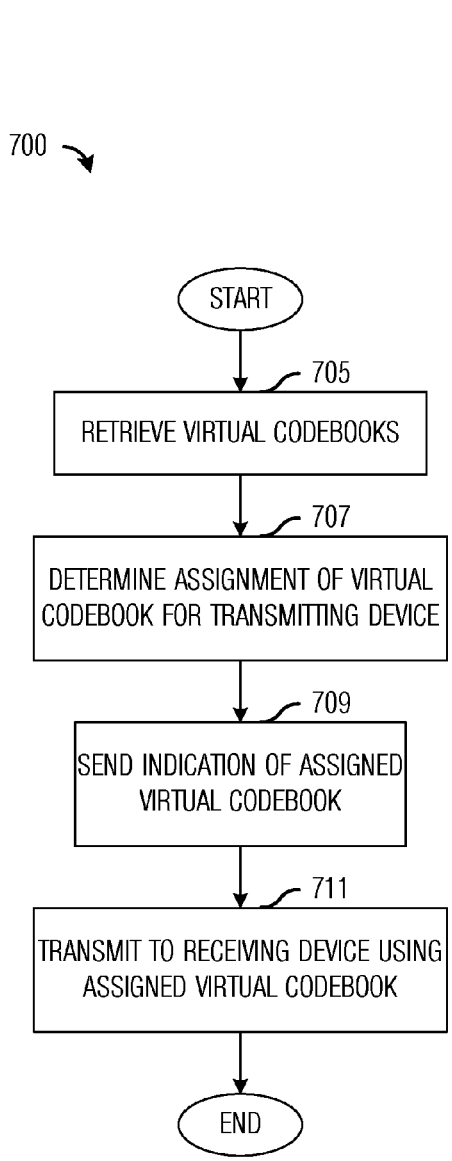
FIG. 7a illustrates a flow diagram of first example operations occurring in a transmitting device as the transmitting device communicates with a receiving device using SCMA and/or LDS with a virtual codebook according to example embodiments described herein.

FIG. 7a illustrates a flow diagram of first example operations 700 occurring in a transmitting device as the transmitting device communicates with a receiving device using SCMA and/or LDS with a virtual codebook. Operations 700 may be indicative of operations occurring in a transmitting device, such as an eNB or a UE, as the transmitting device communicates with a receiving device using SCMA and/or LDS with a virtual codebook.

Operations 700 may begin with the transmitting device retrieving virtual codebooks of low PAPR combination block sequences (block 705). According to an example embodiment, the transmitting device may retrieve the virtual codebooks from a memory located in the transmitting device. According to another example embodiment, the transmitting device may retrieve the virtual codebooks from a remote memory or database. According to another example embodiment, the virtual codebooks of low PAPR combination block sequences are generated in a random or pseudo-random manner and the transmitting device may retrieve low PAPR combination block sequences from a local memory or a remote memory or a remote data base.

The transmitting device may determine an assignment of a virtual codebook for itself (the transmitting device) (block 707). According to an example embodiment, the transmitting device may retrieve the assignment from a memory, a local or remote database, and the like. According to an example embodiment, the transmitting device may make the assignment of the virtual codebook. According to an example embodiment, the assignment of the virtual codebooks may be based on device capability. As an example, a device with a low capability transmitter or a low capacity battery may be assigned a virtual codebook with a particularly low PAPR. According to another example embodiment, the assignment of the virtual codebooks may be based on a type of the transmitting device. As an example, different virtual codebooks may be assigned according to transmitting device type, such as personal computer, smart telephone, sensor, M2M device, and the like. According to yet another example embodiment, the assignment of the virtual codebooks may be based on geo-location information of the transmitting device. As an example, different virtual codebooks may be assigned based on distance from receiving device, sector of a sectorized antenna, and the like. According to yet another example embodiment, the assignment of the virtual codebooks may be based on traffic type, traffic priority, device priority, channel condition, and the like.

The transmitting device may send an indication of the virtual codebook assigned to the transmitting device to the receiving device (block 709). According to an example embodiment, both the transmitting device and the receiving device have access to the virtual codebooks, e.g., stored in a local memory, and the indication may be an index of the virtual codebook assigned to the transmitting device. According to another example embodiment, the transmitting device may transmit a sequence of low PAPR combination block sequences (or an indication thereof) to the receiving device. The transmitting device may transmit to the receiving device using the assigned virtual codebook (block 711). As discussed previously, transmitting to the receiving device may involve the transmitting device spreading a packet being transmitted to the receiving device using the assigned virtual codebook and transmitting the spread packet to the receiving device.

Since an assigned virtual codebook typically comprises a fixed number of low PAPR combination block sequences, the assigned virtual codebook may be either too long or too short for the transmission and/or reception of some packets. If the assigned virtual codebook is too long, the assigned virtual codebook may be scaled with a scaling factor smaller than 1 to produce the proper number of combination block sequences. As an illustrative example, if the transmitting device is transmitting a packet over 10 time resources and the assigned virtual codebook comprises 30 low PAPR combination block sequences, the transmitting device may scaled with a scaling factor equal to 10/30, truncating the assigned virtual codebook to 10 low PAPR combination block sequences. Generally, the truncation used will preserve low PAPR qualities, but it may be possible to select other sub-sequences in the assigned virtual codebook. While, if the assigned virtual codebook is too short, the assigned virtual codebook may be scaled with a scaling factor greater than 1 to produce the proper number of low PAPR combination block sequences. As an illustrative example, if the transmitting device is transmitting a packet over 90 time resources and the assigned virtual codebook comprises 30 combination block sequences, the transmitting device may scale the virtual codebook with a scaling factor of 3. As discussed previously, scaling factors may also be non-integer values, which means that the virtual codebooks are repeated the INT(scaling factor) times and combined with a truncated version of the virtual codebook truncated by FRACTION(scaling factor).

Similarly, a virtual codebook may be generated from low PAPR combination block sequences with a fixed block length each (e.g., the virtual codebooks shown in FIGS. 6a, 6b, and 6c are generated from low PAPR combination block sequences with a block length of 2). However, a situation may arise where low PAPR combination block sequences with different block lengths are needed. In such a situation, the virtual codebook may be modified by increasing or shortening the length of the low PAPR combination block sequences in the virtual codebook. Alternatively, multiple sets of virtual codebooks, with each set being designed from low PAPR combination block sequences of different block lengths, may be available for use in such situations. The use of virtual codebooks with low PAPR combination block sequences with block lengths that match the needed block length ensures that the low PAPR properties are optimized.

According to an example embodiment, operations associated with blocks 705, 707, and 709 are performed at a controlling device instead of the transmitting device. The controlling device may be the transmitting device, or the receiving device. The controlling device may also be an alternate device not directly involved in the communications between the transmitting device and the receiving device, but is responsible for assigning the virtual codebook (s) to the transmitting device.

Figure 7B:
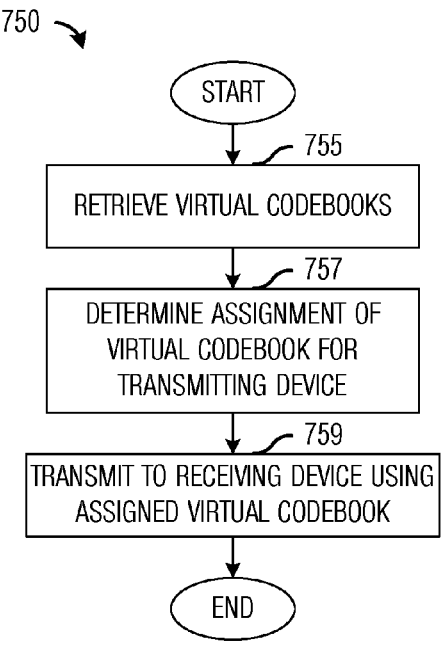
FIG. 7b illustrates a flow diagram of second example operations occurring in a transmitting device as the transmitting device communicates with a receiving device using SCMA and/or LDS with a virtual codebook according to example embodiments described herein.

FIG. 7b illustrates a flow diagram of second example operations 750 occurring in a transmitting device as the transmitting device communicates with a receiving device using SCMA and/or LDS with a virtual codebook. Operations 750 may be indicative of operations occurring in a transmitting device, such as an eNB or a UE, as the transmitting device communicates with a receiving device using SCMA and/or LDS with a virtual codebook.

Operations 750 may begin with the transmitting device retrieving virtual codebooks (block 755). According to an example embodiment, the transmitting device may retrieve the virtual codebooks from a memory located in the transmitting device. According to another example embodiment, the transmitting device may retrieve the virtual codebooks from a remote memory or database. According to another example embodiment, the sequence of low PAPR combination block sequences of the virtual codebook is generated in a random or pseudo-random manner and the transmitting device may retrieve the low PAPR combination block sequences from a local memory or a remote memory or a remote data base.

The transmitting device may determine an assignment of a virtual codebook for the transmitting device (block 757). According to an example embodiment, the transmitting device may retrieve the assignment from a memory, a local or remote database, and the like. According to an example embodiment, the assignment of the virtual codebooks may be based on device capability. As an example, a device with a low capability transmitter or a low capacity battery may be assigned a virtual codebook with a particularly low PAPR. According to another example embodiment, the assignment of the virtual codebooks may be based on a type of the transmitting device. As an example, different virtual codebooks may be assigned according to transmitting device type, such as personal computer, smart telephone, sensor, M2M device, and the like. According to yet another example embodiment, the assignment of the virtual codebooks may be based on geo-location information of the transmitting device. As an example, different virtual codebooks may be assigned based on distance from receiving device, sector of a sectorized antenna, and the like. According to yet another example embodiment, the assignment of the virtual codebooks may be based on traffic type, traffic priority, device priority, channel condition, and the like.

As discussed previously, it may be possible for the receiving device to use blind detection with possible low PAPR combination block sequences as hypotheses to decode the transmissions made by the transmitting device without having knowledge of the virtual codebook being used by the transmitting device. Therefore, the transmitting device may transmit to the receiving device using the assigned virtual codebook without having to send an indication of the virtual codebook assigned to the receiving device (block 759). Additionally, if the transmitting device is using a random or pseudo-random technique for time domain hopping, the transmitting device may not have a priori knowledge of the virtual codebook, preventing the transmitting device from informing the receiving device of the virtual codebook.

According to an example embodiment, operations associated with blocks 755, and 757, are performed at a controlling device instead of the transmitting device. The controlling device may be the transmitting device, or the receiving device. The controlling device may also be an alternate device not directly involved in the communications between the transmitting device and the receiving device, but is responsible for assigning the virtual codebook(s) to the transmitting device.

Figure 7C:
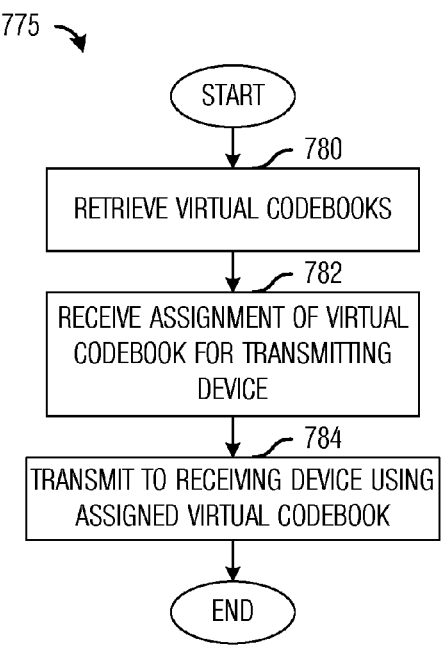
FIG. 7c illustrates a flow diagram of third example operations occurring in a transmitting device as the transmitting device communicates with a receiving device using SCMA and/or LDS with a virtual codebook according to example embodiments described herein.

FIG. 7c illustrates a flow diagram of third example operations 775 occurring in a transmitting device as the transmitting device communicates with a receiving device using SCMA and/or LDS with a virtual codebook. Operations 775 may be indicative of operations occurring in a transmitting device, such as an eNB or a UE, as the transmitting device communicates with a receiving device using SCMA and/or LDS with a virtual codebook.

Operations 775 may begin with the transmitting device retrieving virtual codebooks of low PAPR combination block sequences (block 780). According to an example embodiment, the transmitting device may retrieve the virtual codebooks from a memory located in the transmitting device. According to another example embodiment, the transmitting device may retrieve the virtual codebooks from a remote memory or database. According to another example embodiment, the sequence of low PAPR combination block sequences of the virtual codebook is generated in a random or pseudo-random manner and the transmitting device may retrieve the low PAPR combination block sequences from a local memory or a remote memory or a remote data base.

The transmitting device may receive an assignment of a virtual codebook for the transmitting device (block 782). According to an example embodiment, the assignment of the virtual codebook may be made by a receiving device and the receiving device may send an indicator of assignment to the transmitting device. Since the assignment of the virtual codebook is made by the receiving device, the transmitting device does not need to send an indicator of the assignment to the receiving device. The transmitting device may transmit to the receiving device using the assigned virtual codebook (block 784).

Figure 8A:
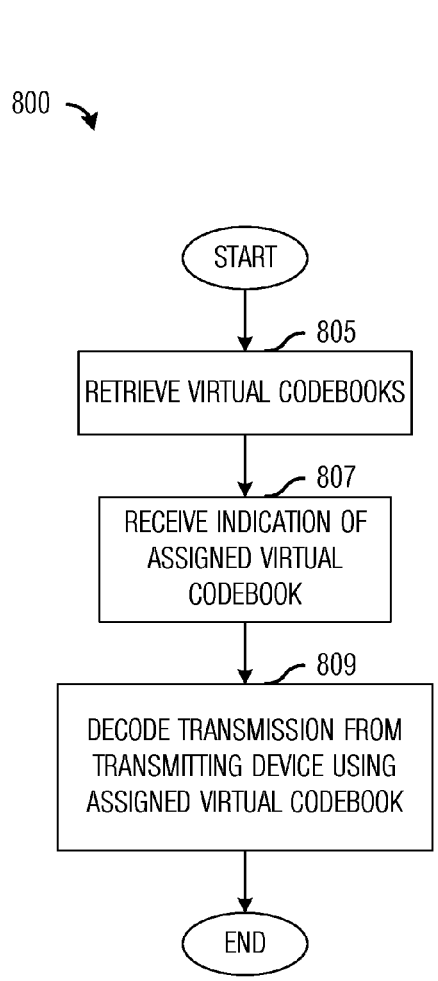
FIG. 8a illustrates a flow diagram of first example operations occurring in a receiving device as the receiving device communicates with a transmitting device using SCMA and/or LDS with a virtual codebook according to example embodiments described herein.

FIG. 8a illustrates a flow diagram of first example operations 800 occurring in a receiving device as the receiving device communicates with a transmitting device using SCMA and/or LDS with a virtual codebook. Operations 800 may be indicative of operations occurring in a receiving device, such as an eNB or a UE, as the receiving device communicates with a transmitting device using SCMA and/or LDS with a virtual codebook.

Operations 800 may begin with the receiving device retrieving virtual codebooks of low PAPR combination block sequences (block 805). According to an example embodiment, the receiving device may retrieve the virtual codebooks from a memory located in the receiving device.

According to another example embodiment, the receiving device may retrieve the virtual codebooks from a remote memory or database.

The receiving device may receive an indication of an assigned virtual codebook (block 807). According to an example embodiment, the indication may be an index of the virtual codebook assigned to the transmitting device. According to another example embodiment, the indication may be of a virtual codebook out of a plurality of possible virtual codebooks, a sequence of low PAPR combination block sequences out of a plurality of sequences of low PAPR combination block sequences, and the like. The receiving device may receive and decode a transmission from the transmitting device using the assigned virtual codebook (block 809). As an illustrative example, receiving and decoding the transmission from the transmitting device may involve detecting a transmission in network resources assigned to the receiving device and using the sparse codebooks (or sparse signatures) associated with the assigned virtual codebook to decode the transmission.

Since assigned virtual codebook typically comprises a fixed number of low PAPR combination block sequences, the assigned virtual codebook may be either too long or too short for the transmission and/or reception of some packets. If the assigned virtual codebook is too long, the assigned virtual codebook may be truncated to the proper number of low PAPR combination block sequences. As an illustrative example, if the receiving device is receiving a packet transmission over 10 time resources and the assigned virtual codebook comprises 30 low PAPR combination block sequences, the receiving device may scale the assigned virtual codebook with a scaling factor of 10/30 to produce 10 low PAPR combination block sequences, with the use of a truncation function, for example. Generally, the truncation used will preserve low PAPR qualities, but it may be possible to select other sub-sequences in the assigned virtual codebook. While, if the assigned virtual codebook is too short, the assigned virtual codebook may be scaled with a scaling factor greater than 1 to produce the proper number of low PAPR combination block sequences. As an illustrative example, if the receiving device is receiving a packet transmission over 90 time domain resources and the assigned virtual codebook comprises 30 low PAPR combination block sequences, the receiving device may scale the virtual codebook with a scaling factor of 3.

Figure 8B:
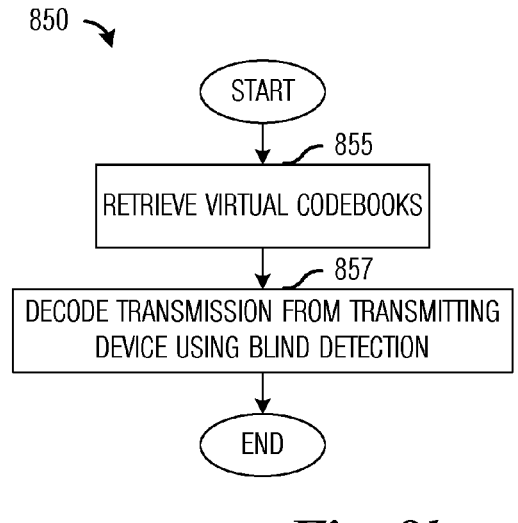
FIG. 8b illustrates a flow diagram of second example operations occurring in a receiving device as the receiving device communicates with a transmitting device using SCMA and/or LDS with a virtual codebook according to example embodiments described herein.

FIG. 8b illustrates a flow diagram of second example operations 850 occurring in a receiving device as the receiving device communicates with a transmitting device using SCMA and/or LDS with a virtual codebook. Operations 850 may be indicative of operations occurring in a receiving device, such as an eNB or a UE, as the receiving device communicates with a transmitting device using SCMA and/or LDS with a virtual codebook.

Operations 850 may begin with the receiving device retrieving virtual codebooks of low PAPR combination block sequences (block 855). According to an example embodiment, the receiving device may retrieve the virtual codebooks of low PAPR combination block sequences from a memory located in the receiving device. According to another example embodiment, the receiving device may retrieve the virtual codebooks of low PAPR combination block sequences from a remote memory or database.

As discussed previously, the receiving device may use blind detection with possible low PAPR combination block sequences (e.g., from the virtual codebook) as hypotheses to decode the transmissions made by the transmitting device without having knowledge of the virtual codebook actually being used by the transmitting device. Therefore, the receiving device may receive and decode a transmission from the transmitting device using blind detection without having to receive an indication of the virtual codebook assigned to the transmitting device (block 857).

Figure 8C:
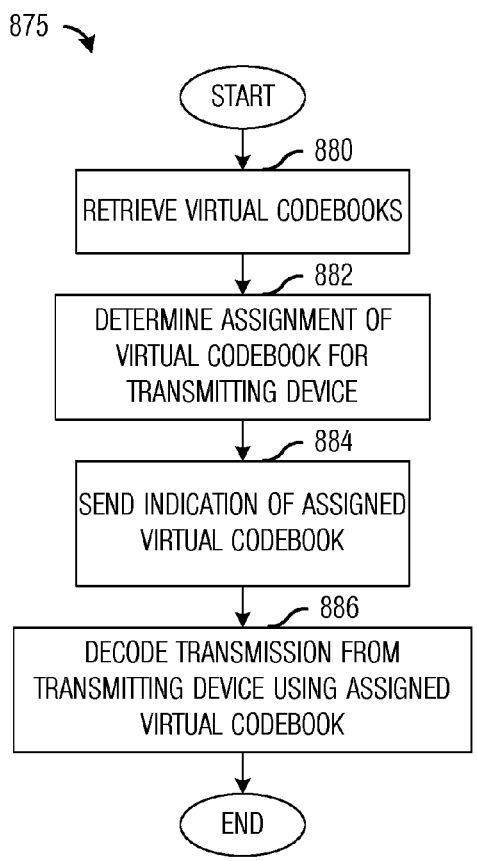
FIG. 8c illustrates a flow diagram of third example operations occurring in a receiving device as the receiving device communicates with a transmitting device using SCMA and/or LDS with a virtual codebook according to example embodiments described herein.

FIG. 8c illustrates a flow diagram of third example operations 875 occurring in a receiving device as the receiving device communicates with a transmitting device using SCMA and/or LDS with a virtual codebook. Operations 875 may be indicative of operations occurring in a receiving device, such as an eNB or a UE, as the receiving device communicates with a transmitting device using SCMA and/or LDS with a virtual codebook.

Operations 875 may begin with the receiving device retrieving virtual codebooks of low PAPR combination block sequences (block 880). According to an example embodiment, the receiving device may retrieve the virtual codebooks of low PAPR combination block sequences from a memory located in the receiving device. According to another example embodiment, the receiving device may retrieve the virtual codebooks of low PAPR combination block sequences from a remote memory or database.

The receiving device may determine an assignment of a virtual codebook for the transmitting device (block 882). According to an example embodiment, the assignment of the virtual codebooks may be based on transmitting device capability. As an example, a device with a low capability transmitter or a low capacity battery may be assigned a virtual codebook with a particularly low PAPR. According to another example embodiment, the assignment of the virtual codebooks may be based on a type of the transmitting device. As an example, different virtual codebooks may be assigned according to transmitting device type, such as personal computer, smart telephone, sensor, M2M device, and the like. According to yet another example embodiment, the assignment of the virtual codebooks may be based on geo-location information of the transmitting device. As an example, different virtual codebooks may be assigned based on distance from receiving device, sector of a sectorized antenna, and the like. According to yet another example embodiment, the assignment of the virtual codebooks may be based on traffic type, traffic priority, device priority, channel condition, and the like.

The receiving device may send an indication of the virtual codebook assigned to the transmitting device (block 884). According to an example embodiment, both the transmitting device and the receiving device have access to the virtual codebooks, e.g., stored in a local memory, and the indication may be an index of the virtual codebook assigned to the transmitting device. According to another example embodiment, the receiving device may transmit an indication of a sequence of low PAPR combination block sequences making up the virtual codebook out of a plurality of low PAPR sequences of combination block sequences, and the like, to the transmitting device. The receiving device may receive and decode a transmission from the transmitting device using the assigned virtual codebook (block 886). As an illustrative example, receiving and decoding the transmission from the transmitting device may involve detecting a transmission in network resources assigned to the receiving device and using the sparse codebooks and/or sparse signatures associated with the assigned virtual codebook to decode the transmission.

Figure 9:
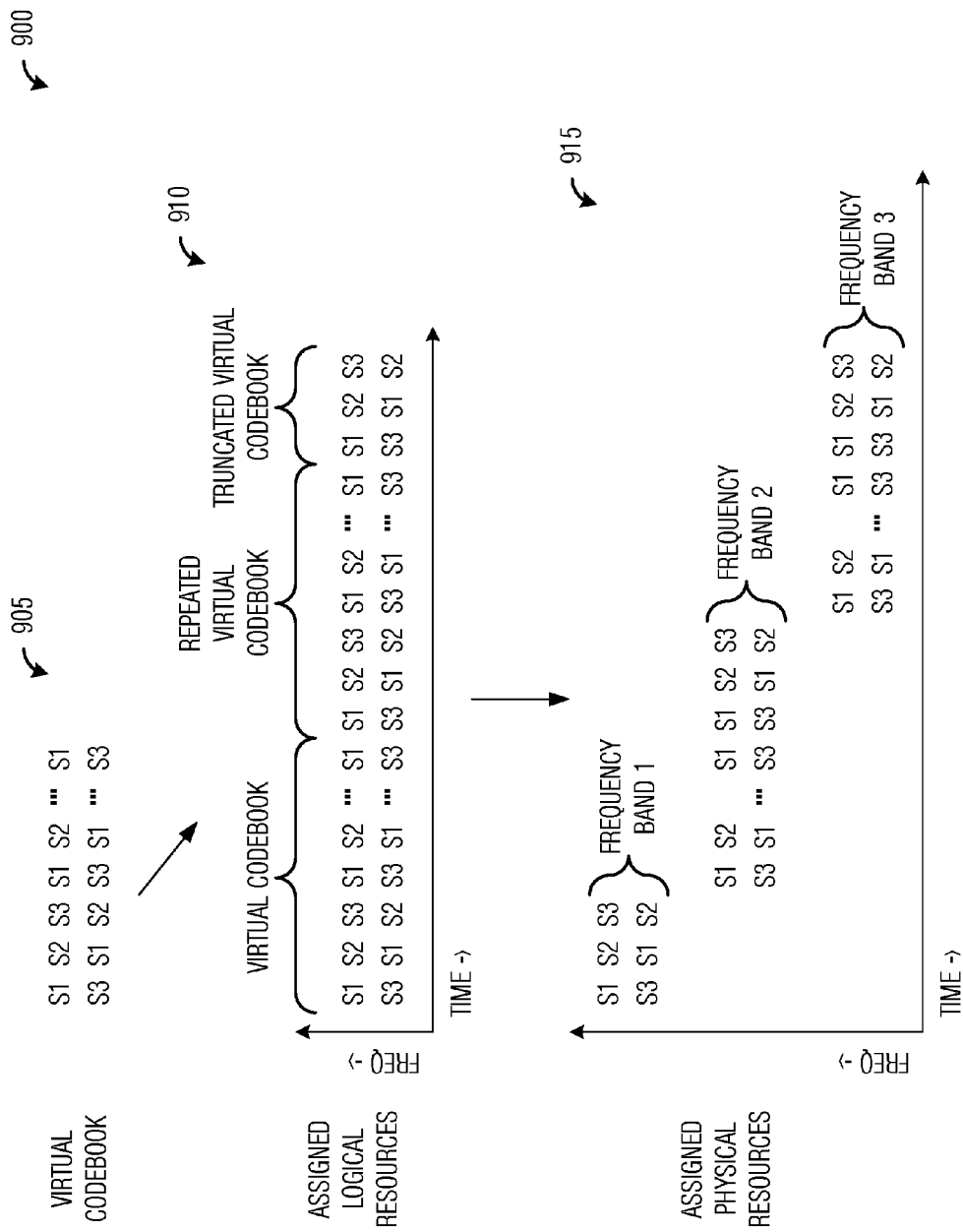
FIG. 9 illustrates an example mapping of a virtual codebook to logical resources and physical resources according to example embodiments described herein.

FIG. 9 illustrates a diagram 900 highlighting an example mapping of a virtual codebook to logical resources and physical resources. As shown in FIG. 9, a virtual codebook 905 includes a sequence of low PAPR combination block sequences. The low PAPR combination block sequences of virtual codebook 905 may be assigned to logical resources (shown in highlight 910). The logical resources include time resources and frequency resources. It is noted that, as shown in FIG. 9, virtual codebook 905 is not long enough to cover the time resources, so virtual codebook 905 is repeated twice, with the second repetition of virtual codebook 905 being truncated. The logical resources (shown in highlight 910) may be mapped to physical resources (shown in highlight 915). The physical resources include physical time resources and physical frequency resources. As shown in FIG. 9, the logical resources may be mapped to physical resources that belong in different frequency bands. Although shown in FIG. 9 as being mapped to physical resources of multiple frequency bands, a different mapping may result in the logical resources being mapped to physical resources of a single frequency band.

Figure 10:
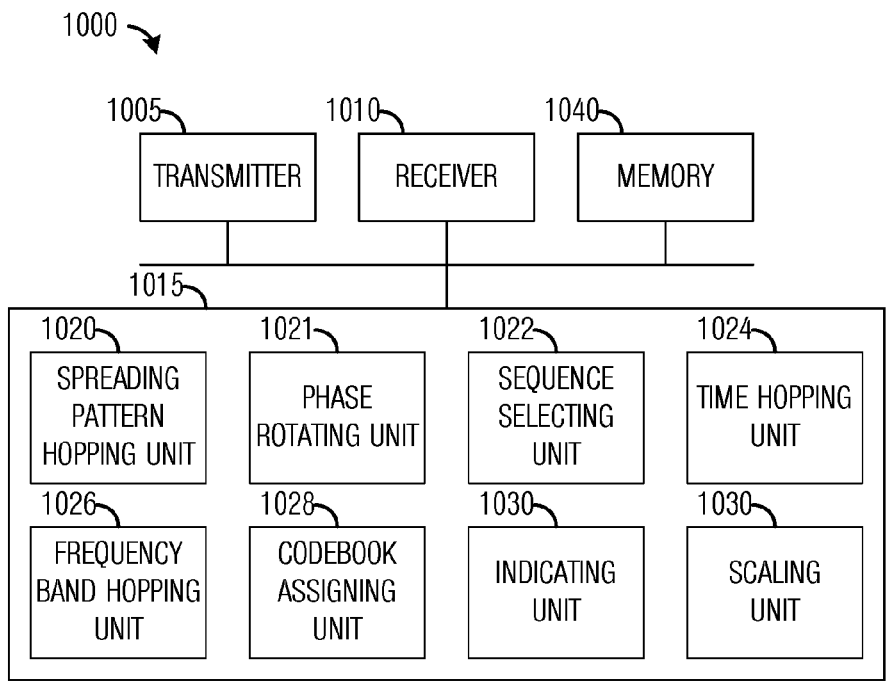
FIG. 10 illustrates an example first communications device according to example embodiments described herein.

FIG. 10 illustrates an example first communications device 1000. Communications device 1000 may be an implementation of a transmitting device, such as a communications controller, such as an eNB, a base station, a NodeB, a controller, and the like, a UE, such as a user, a subscriber, a terminal, a mobile, a mobile station, and the like, that includes a co-located designing device or a stand-alone designing device. Communications device 1000 may be used to implement various ones of the embodiments discussed herein. As shown in FIG. 10, a transmitter 1005 is configured to transmit frames, combination block sequences, indications, and the like. Communications device 1000 also includes a receiver 1010 that is configured to receive frames, and the like.

A spreading pattern hopping unit 1020 is configured to apply codebook and/or signature hopping to sparse codebooks (or sparse signatures) to generate available combination block sequences of sparse codebooks. A phase rotating unit 1021 is configured to apply phase rotations, such as Newman Phase rotations, Shroeder Phase rotations, modified Shroeder Phase rotations, and the like, to available combination block sequences to optimize PAPR for the available combination block sequences. A selecting unit 1022 is configured to select the PAPR optimized combination block sequences as generated by phase rotating unit 1021 that have a PAPR that meets a PAPR threshold and produce low PAPR combination block sequences. A time hopping unit 1024 is configured to apply time domain hopping to the low PAPR combination block sequences to produce virtual codebooks of low PAPR combination block sequences that may be assigned to transmitting devices. The use of time domain hopping generally generates more virtual codebooks than the number of low PAPR combination block sequences, the number of receiving devices that can be supported may be increased. Time hopping unit 1024 is configured to produce virtual codebooks of low PAPR combination block sequences. A frequency band hopping unit 1026 is configured to make use of frequency band hopping to increase frequency diversity. In situations where multiple frequency bands are available, frequency band hopping unit 1026 increases frequency diversity by using frequency bands that are relatively far apart for transmissions to receiving devices. A codebook assigning unit 1028 is configured to assign a virtual codebook to a transmitting device. Codebook assigning unit 1028 is configured to make use of factors, including device capability, device types, geo-location information, traffic types, traffic priorities, receiving device priorities, channel condition, and the like, to assign the virtual codebooks. An indicating unit 1030 is configured to generate an indication of the selected virtual codebook. As an example the indication includes a representation of the assigned virtual codebook, a sequence of combination block sequences of the assigned virtual codebook, and the like. A scaling unit 1032 is configured to scale a virtual codebook by a scaling factor. A memory 1040 is configured to store sparse signatures and/or sparse codebooks, combination block sequences of sparse codebooks, low PAPR combination block sequences, PAPRs, PAPR thresholds, virtual codebooks, frequency band hopping information, indicators, scaling factors, and the like.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, receiver 1010 and transmitter 1005 may be implemented as a specific hardware block, while spreading pattern hopping unit 1020, phase rotating unit 1021, sequence selecting unit 1022, time hopping unit 1024, frequency band hopping unit 1026, codebook assigning unit 1028, indicating unit 1030, and a scaling unit 1032 may be software modules executing in a microprocessor (such as processor 1015) or a custom circuit or a custom compiled logic array of a field programmable logic array. Spreading pattern hopping unit 1020, phase rotating unit 1021, sequence selecting unit 1022, time hopping unit 1024, frequency band hopping unit 1026, codebook assigning unit 1028, indicating unit 1030, and a scaling unit 1032 may be modules stored in memory 1040.

Figure 11:
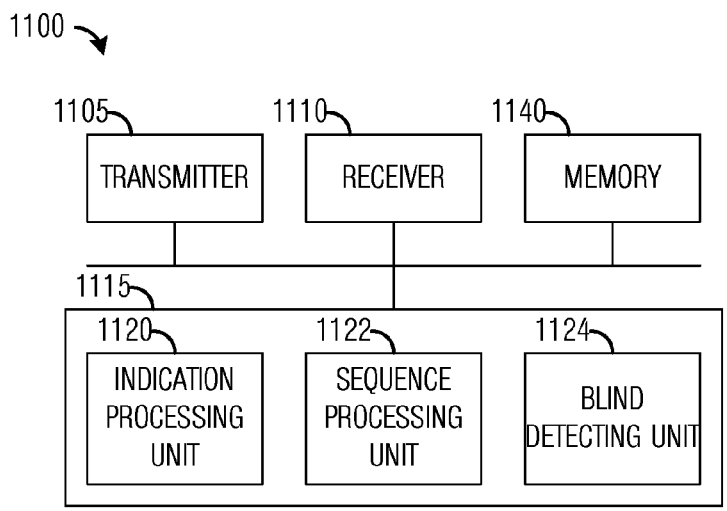
FIG. 11 illustrates an example second communications device according to example embodiments described herein.

FIG. 11 illustrates an example second communications device 1100. Communications device 1100 may be an implementation of a receiving device, such as a communications controller, such as an eNB, a base station, a NodeB, a controller, and the like, or a UE, such as a user, a subscriber, a terminal, a mobile, a mobile station, and the like. Communications device 1100 may be used to implement various ones of the embodiments discussed herein. As shown in FIG. 11, a transmitter 1105 is configured to transmit frames, and the like. Communications device 1100 also includes a receiver 1110 that is configured to receive frames, combination block sequences, indications, and the like.

An indication processing unit 1120 is configured to process an indicator of a virtual codebook. Indication processing unit 1120 is configured to retrieve the virtual codebook from a memory using the virtual codebook information, for example. Indication processing unit 1120 is configured to generate an indication of a virtual codebook selected for a transmitting device. A sequence processing unit 1122 is configured to generate sequences of low PAPR combination block sequences of virtual codebooks used in decoding a received transmission from the virtual codebook information. Sequence processing unit 1122 is configured to scale virtual codebooks by scaling factors. A blind detecting unit 1124 is configured to decode network resources by performing blind detection using different low PAPR combination block sequence hypotheses on the network resources. Blind detecting unit 1124 is configured to perform blind detection until the transmission is successfully decoded or until low PAPR combination block sequence as hypotheses are exhausted. A memory 1140 is configured to store sparse codebooks and/or sparse signatures, combination block sequences, frequency band hopping information, indicators, virtual codebooks, and the like.

The elements of communications device 1100 may be implemented as specific hardware logic blocks. In an alternative, the elements of communications device 1100 may be implemented as software executing in a processor, controller, application specific integrated circuit, or so on. In yet another alternative, the elements of communications device 1100 may be implemented as a combination of software and/or hardware.

As an example, receiver 1110 and transmitter 1105 may be implemented as a specific hardware block, while indication processing unit 1120, sequence processing unit 1122, and blind detecting unit 1124 may be software modules executing in a microprocessor (such as processor ills) or a custom circuit or a custom compiled logic array of a field programmable logic array. Indication processing unit 1120, sequence processing unit 1122, and blind detecting unit 1124 may be modules stored in memory 1140.

Although the present disclosure and its advantages have been described in detail, it should be understood that various changes, substitutions and alterations can be made herein without departing from the spirit and scope of the disclosure as defined by the appended claims.

What is claimed is:

1. A method for generating a virtual codebook of low peak to average ratio (PAPR) combination block sequences of sparse codebooks, the method comprising:
    generating, by a designing device, a plurality of low PAPR combination block sequences, with each low PAPR combination block sequence including at least one of a plurality of sparse codebook;
    applying, by the designing device, time domain hopping to the plurality of low PAPR combination block sequences, thereby producing a virtual codebook; and
    storing, by the designing device, the virtual codebook.

2. The method of claim 1, wherein storing the virtual codebook further comprises storing the virtual codebook in a remote memory.

3. The method of claim 1, wherein the virtual codebook comprises a sequence of at least one low PAPR combination block sequence.

4. The method of claim 1, wherein generating the plurality of low PAPR combination block sequences comprises:
    optimizing PAPR values associated with each of a plurality of available combination block sequences; and
    selecting candidate combination block sequences from the plurality of available combination block sequences with optimized PAPR values that meet a PAPR threshold, thereby producing the plurality of low PAPR combination block sequences.

5. The method of claim 4, wherein optimizing the PAPR values comprises applying a phase rotation to each of the plurality of available combination block sequences.

6. The method of claim 5, wherein applying the phase rotation comprises applying one of a Newman Phase rotation, a Shroeder Phase rotation, or a modified Shroeder Phase rotation to each of the plurality of available combination block sequences.

7. The method of claim 4, further comprising applying codebook hopping to the plurality of sparse codebooks to produce the plurality of available combination block sequences.

8. The method of claim 1, wherein the plurality of sparse codebooks comprise sparse code multiple access (SCMA) codebooks.

9. The method of claim 1, wherein the plurality of sparse codebooks comprise sparse low density sequence (LDS) signatures.

10. The method of claim 1, wherein storing the virtual codebook further comprises storing the virtual codebook in a memory of a transmitting or receiving device.

11. A designing device for generating a virtual codebook of low peak to average ratio (PAPR) combination block sequences of sparse codebooks, the designing device comprising:
    at least one processor; and
    a non-transitory computer readable storage medium storing programming for execution by the at least one processor, the programming including instructions for:
        generating a plurality of low PAPR combination block sequences, with each low PAPR combination block sequence including at least one of a plurality of sparse codebook;
        applying time domain hopping to the plurality of low PAPR combination block sequences, thereby producing a virtual codebook; and
        storing the virtual codebook.

12. The designing device of claim 11, wherein the instructions for storing the virtual codebook comprise instructions for storing the virtual codebook in a remote memory.

13. The designing device of claim 11, wherein the virtual codebook comprises a sequence of at least one low PAPR combination block sequence.

14. The designing device of claim 11, wherein the instructions for generating the plurality of low PAPR combination block sequences comprise instructions for:
    optimizing PAPR values associated with each of a plurality of available combination block sequences; and
    selecting candidate combination block sequences from the plurality of available combination block sequences with optimized PAPR values that meet a PAPR threshold, thereby producing the plurality of low PAPR combination block sequences.

15. The designing device of claim 14, wherein the instructions for optimizing the PAPR values comprise instructions for applying a phase rotation to each of the plurality of available combination block sequences.

16. The designing device of claim 15, wherein the instructions for applying the phase rotation comprise instructions for applying one of a Newman Phase rotation, a Shroeder Phase rotation, or a modified Shroeder Phase rotation to each of the plurality of available combination block sequences.

17. The designing device of claim 14, wherein the programming includes further instructions for applying codebook hopping to the plurality of sparse codebooks to produce the plurality of available combination block sequences.

18. The designing device of claim 11, wherein the plurality of sparse codebooks comprise sparse code multiple access (SCMA) codebooks.

19. The designing device of claim 11, wherein the plurality of sparse codebooks comprise sparse low density sequence (LDS) signatures.

20. The designing device of claim 11, wherein the instructions for storing the virtual codebook comprise instructions for storing the virtual codebook in a memory of a transmitting or receiving device.

* * * * *